United States Patent
Garcia et al.

(10) Patent No.: US 10,623,900 B2
(45) Date of Patent: Apr. 14, 2020

(54) SERVER IDENTIFIER ACQUISITION BASED ON DEVICE LOCATION

(75) Inventors: Miguel Angel Garcia, Salamanca (ES); Anders Jan Olof Kall, Espoo (FI); Frej Sebastian Kraufvelin, Tenhola (FI)

(73) Assignee: Nokia Solutions and Networks Oy, Espoo (FI)

( * ) Notice: Subject to any disclaimer, the term of this patent is extended or adjusted under 35 U.S.C. 154(b) by 1085 days.

(21) Appl. No.: 12/866,129

(22) PCT Filed: Feb. 6, 2008

(86) PCT No.: PCT/EP2008/000906
§ 371 (c)(1),
(2), (4) Date: Aug. 30, 2010

(87) PCT Pub. No.: WO2009/097870
PCT Pub. Date: Aug. 13, 2009

(65) Prior Publication Data
US 2011/0004672 A1    Jan. 6, 2011

(51) Int. Cl.
    G06F 15/16    (2006.01)
    H04W 4/029   (2018.01)
    H04L 29/08    (2006.01)
    H04W 76/50   (2018.01)
    H04J 11/00    (2006.01)
    H04W 4/90     (2018.01)

(52) U.S. Cl.
    CPC ............ *H04W 4/029* (2018.02); *H04L 67/18* (2013.01); *H04W 76/50* (2018.02); *H04J 11/0069* (2013.01); *H04L 67/1002* (2013.01); *H04L 67/1021* (2013.01); *H04W 4/90* (2018.02)

(58) Field of Classification Search
    CPC ....... H04W 64/00; H04W 4/02; H04W 4/025; H04W 4/90; H04W 76/50; G06F 2221/2111; G06Q 30/0261; H04J 11/0069; H04L 67/1002; H04L 67/1021; H04L 67/18
    USPC ......................................................... 709/220
    See application file for complete search history.

(56) References Cited

U.S. PATENT DOCUMENTS

| | | | |
|---|---|---|---|
| 8,218,535 B1 * | 7/2012 | Hurtta | H04L 12/4633 370/338 |
| 8,301,111 B2 * | 10/2012 | Noldus et al. | 455/404.2 |
| 2004/0198413 A1 * | 10/2004 | Smith et al. | 455/550.1 |

(Continued)

FOREIGN PATENT DOCUMENTS

WO    WO 2004/068888 A2    8/2004

OTHER PUBLICATIONS

H. Schulzrinne, "Location-to-URL Mapping Architecture and Framework", Draft-Schulzrinne-ecrit-mapping-arch-00, ECRIT Internet-Draft, Oct. 16, 2005.

(Continued)

*Primary Examiner* — Phuoc H Nguyen
(74) *Attorney, Agent, or Firm* — Harrington & Smith

(57) ABSTRACT

The present invention relates to a method, apparatus, system, and computer program product, in which a unique identifier of a node of a network is used to request from a database location-dependent information for a device attached to said node. An identifier of at least one server serving an area in which said device is located is then retrieved by using said location-dependent information.

22 Claims, 7 Drawing Sheets

(56) References Cited

U.S. PATENT DOCUMENTS

| | | | |
|---|---|---|---|
| 2006/0116988 A1* | 6/2006 | Toebes | H04L 67/1021 |
| 2007/0153982 A1 | 7/2007 | Bloebaum et al. | 379/33 |
| 2007/0153984 A1* | 7/2007 | Bloebaum et al. | 379/33 |
| 2008/0227430 A1* | 9/2008 | Polk | 455/404.2 |
| 2010/0069090 A1* | 3/2010 | Contractor | 455/456.1 |
| 2010/0189035 A1* | 7/2010 | Pehrsson et al. | 370/328 |

OTHER PUBLICATIONS

H. Schulzrinne et al., "A Dynamic Host Configuration Protocol (DHCP) based Location-to-Service Translation Protocol (LoST) Discovery Procedure", draft-ietf-ecrit-dhc-lost-discovery-02.txt, ECRIT Internet-Draft, Jul. 8, 2007.

H. Schulzrinne, "A Uniform Resource Name (URN) for Services", draft-schulzrinne-sipping-services-01, SIPPING-Internet-Draft, Oct. 23, 2005.

L. Daigle, Domain-Based Application Service Location Using URIs and the Dynamic Delegation Discovery Service (DDDS), Network Working Group, Standards Track, Apr. 2007.

3GPP TS 23.003 V7.2.0 (Dec. 2006), $3^{rd}$ Generation Partnership Project: Technical Specification Group Core Network and Terminal; Numbering, Addressing and Identification (Release 7).

Schultzrinne, "Emergency Services for Internet Telephony Systems" draft-schulzrinne-sipping-emergency-art-0.2.txt Oct. 2004, IEFT Standard-Working Draft, Internet Engineering Task Force, IETF, Ch, XP015039663.

"A Lost Protocol for Mapping Geographic Locations to Public Safety Answering Points" IEEE, Jan. 1, 2007(Jan. 1, 2007), pp. 606-611, XP002500816.

* cited by examiner

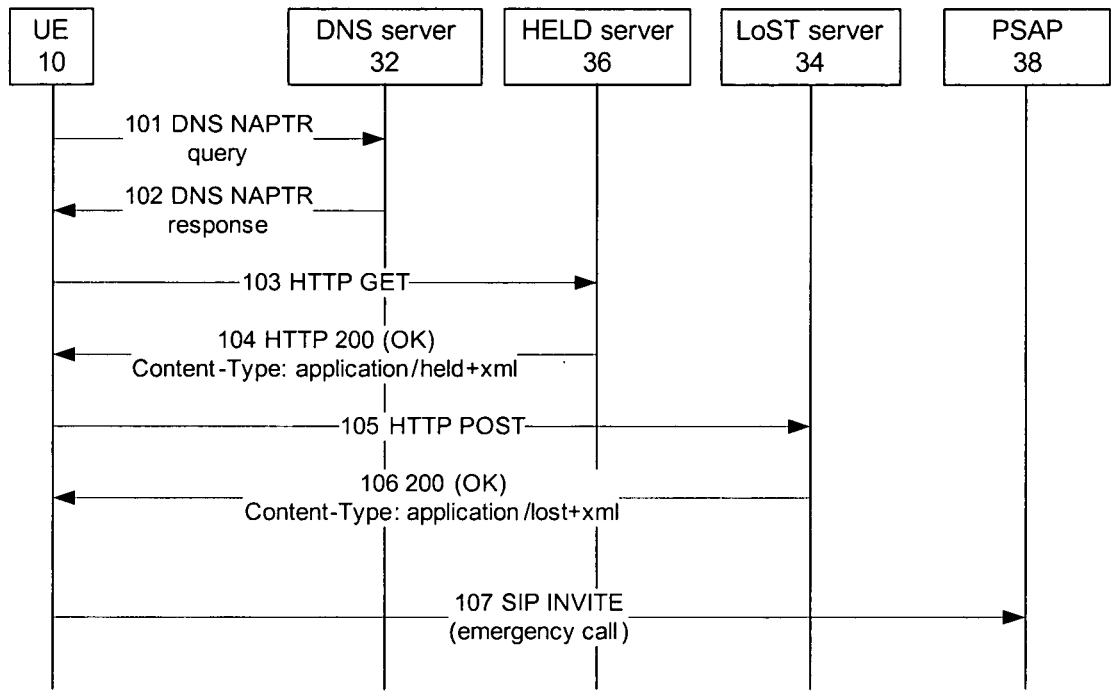

Fig. 2

```
example.com.
;;            order  pref  flags
IN  NAPTR  100    10    " "    "Ecall-CI:LoST            ( ; service
                                " "                        ; regexp
                                lostserver.example.com.  ; replacement
                                                         )

IN  NAPTR  100    10    " "    "Ecall-CI:HELD"           ( ; service
                                " "                        ; regexp
                                heldserver.example.com.  ; replacement
                                                         )

IN  NAPTR  100    10    " "    "Ecall-CGI:LoST           ( ; service
                                " "                        ; regexp
                                lostserver.example.com.  ; replacement
                                                         )

IN  NAPTR  100    10    " "    "Ecall-CGI:HELD"          ( ; service
                                " "                        ; regexp
                                heldserver.example.com.  ; replacement
                                                         )
```

Fig. 3

SERVER IDENTIFIER ACQUISITION BASED ON DEVICE LOCATION

FIELD OF THE INVENTION

The present invention relates to a method, an apparatus and a database for acquiring an identifier of a server, such a for example—but not limited to—an answering point for an emergency call.

BACKGROUND OF THE INVENTION

The location of a device is a useful information for many applications. The device might rely on its access network to provide the location information. This service may be provided by a location configuration server (LCS), wherein the device may request that the LCS provides a location reference in the form of a location URI (Uniform Resource Indicator) or a set of URIs, allowing the device to distribute its location information. The LCS may be accessed by a protocol, such as HELD (HTTP Enabled Location Discovery), which enables retrieval of the location information.

Schulzrinne, H., "Location-to-URL Mapping Architecture and Framework," December 2006 describes a mapping server architecture with a mapping client (seeker or resolver) and a mapping server (resolver or other servers) for discovering server addresses. A query message carries location information and a service identifier encoded as a Uniform Resource Name (URN) (cf. Schulzrinne, H., "A Uniform Resource Name (URN) for Services," August 2006) from a location-to-server translation (LoST) client to a LoST server. The LoST server uses its database to map input values to one or more Uniform Resource Identifiers (URI) and returns those URIs along with optional information, such as hints about the service boundary, in a response message to the LoST client. If the server cannot resolve the query itself, it may in turn query another server or return the address of another LoST server.

If a LoST URL contains a host name rather than an Internet Protocol (IP) address, clients need to use a naming authority pointer (e.g. U-NAPTR described for example in Daigle, L., "Domain-based Application Service Location Using URIs and the Dynamic Delegation Discovery Service (DDDS)," October 2006).

Architecture for emergency calls make usage of the concepts of LoST servers and HELD servers. The LoST server is responsible for translation of location information into the URI of its closest PSAP (Public Safety Answering Point), while the HELD server is responsible for delivering the location of the user. The Location-to-LoST protocol specification describes an XML-based protocol for mapping service identifiers and geodetic or civic location information to service contact URIs. In particular, it can be used to determine the location-appropriate PSAP for emergency services.

A common problem with location issues in IP emergency calls is related to find out which is the LoST or HELD server. This is because the LoST or HELD services have a boundary of operation. For example, a typical LoST server may be able to resolve location-to-PSAP belonging to the political country where the PSAPs belong. Or in big countries, a regional network operator may provide a LoST server which can resolve locations where the operator has coverage. Similar situations can apply to HELD servers as well.

This geographical limitation of LoST and HELD server leads to another problem: How can a device, such as an endpoint, find the URI or IP address of the LoST or HELD server that can provide the endpoint with location related information?

A current solution consist of using the dynamic host configuration protocol (DHCP) for retrieving the URI or IP address of a LoST server, as specified in Internet draft "A Dynamic Host Configuration Protocol (DHCP) based Location-to-Service Translation Protocol (LoST) Discovery Procedure" (cf. http://tools.ietf.org/id/draft-ietf-ecrit-dhc-lost-discovery-02.txt). However, while this solution is technically feasible for fixed endpoints, which usually acquire an IP address with DHCP, the solution is of no use in wireless networks (e.g., in an IP Multimedia Subsystem (IMS)).

Mobile devices (e.g. mobile terminals or mobile nodes) do not typically use DHCP for acquiring an IP address when they use general packet radio services (GPRS) access networks with IP connectivity. Instead, they use the GPRS procedures (e.g., packet data protocol (PDP) context activation) to get an IP address.

On the other hand, since the mobile device might be moving, it can traverse the limit of operation of a PSAP. Therefore, the mobile device may need to discover its local LoST/HELD server at the time an emergency call is done, and not earlier.

SUMMARY OF THE INVENTION

It is an object of the present invention to provide a mechanism for server location acquisition, which is suitable for any (fixed and mobile) devices.

This object is achieved by a method comprising:
using a unique identifier of a node of a network to request from a database location-dependent information for a device attached to said node; and
determining an identifier of at least one server serving an area in which said device is located, by using said location-dependent information.

The above method may be implemented as a computer program product comprising code means for producing the respective above steps when run on a computer device.

Additionally, the above object is achieved by an apparatus comprising service access means configured to use a node identifier of a network node to which said apparatus is attached, in a database request for location-dependent information for said apparatus, and configured to determine an identifier of at least one server serving an area in which said apparatus is located by using said requested information.

The above-mentioned apparatus may be implemented as or in a fixed or mobile network element or node, a fixed or mobile terminal device, or a module, a chip or a chip set provided in these nodes, elements or devices.

Furthermore, the above object is achieved by a database configured to store location-dependent information in association with node identifiers of a network node, wherein said database is configured to output said location-dependent information in response to a request directed to a respective node identifier.

Accordingly, a device is enabled to find out the address of its local proxy with minimum configuration. In particular, a location-dependent address of local servers (e.g. the local LoST and HELD servers) does not have to be pre-configured, but can be learned. As an alternative, the device can construct or set up default server address(es) based on the unique identifier. It can then make a normal server query or request using the default auto-provisioned server addresses to obtain the location-dependent address of the local servers.

The database may have been provisioned with the default addresses to return the desired server addresses. The device can then contact the local servers by using the returned server addresses. As the default server address may go down to access node level, any number of local servers can be provisioned in the database for load balancing purposes.

According to a first aspect, the network may be a wireless (mobile) network and the device may be a wireless (mobile) device.

According to a second aspect, the unique identifier may comprise a cell identifier of a cellular transmission system.

According to a third aspect, the unique identifier may comprise a media access control layer address of an access point of a wireless local area network.

According to a fourth aspect, the unique identifier may comprise a line identifier of the terminal.

Of course, any combination of the above unique identifiers may be used as the unique identifier.

According to a fifth aspect, a default server address may be set up at the mobile device by using at least parts of the cell identifier. In a specific implementation example, the cell identifier may be a cell global identifier, wherein the default server address may be set up from at least one of a mobile network code, a mobile country code and a location area code of the cell global identifier.

In various embodiments, the location-dependent information may be requested by a domain name query. The identifier may comprise a uniform resource indicator. The database may be implemented as a domain name server. In a specific embodiment, the domain name server may comprise or integrate at least one of a translation server and a location discovery server, which serve the network node to obtain the identifier of the at least one server.

The location-dependent information may be requested based on a naming authority pointer resource record.

Furthermore, the location-dependent information may comprise an identifier (for example an address) of the at least one server or, alternatively, an identifier of at least one of the translation server and the location discovery server. In a specific example, the translation server may comprise a location-to-server translation server (e.g. a LoST server) and the location discovery server may comprise a hyper text transfer protocol enabled location discovery server (e.g. a HELD server). The server address may also be for a Secure User Plane Location (SUPL) location platform (SLP) and E-SLP (Enhanced SUPL Location Platform) and SUPL Positioning Center.

The solution may be applied to an emergency call service, wherein the concerned server serves as a public safety answering point.

The device may be a fixed network device equipped with a radio receiver used to extract for example a cell identifier from available radio signals, in order to utilize the extracted cell identifier to request location-dependent information from a data-base.

Further advantageous modifications are defined in dependent claims.

BRIEF DESCRIPTION OF THE DRAWINGS

The present invention will now be described based on embodiments with reference to the accompanying drawings in which:

FIG. 2 shows schematic signaling diagram according to a first embodiment of the present invention;

FIG. 3 shows an exemplary configuration of a resource record according to the first embodiment of the present invention;

DESCRIPTION OF THE EMBODIMENT

In the following, embodiments of the present invention will be described based on an IP emergency call function in a cellular network environment. The cellular network environment is used as an illustrative example of a network environment where the present invention can be used. The invention can be applied to any kind of wireless or fixed networks.

Figure 1:
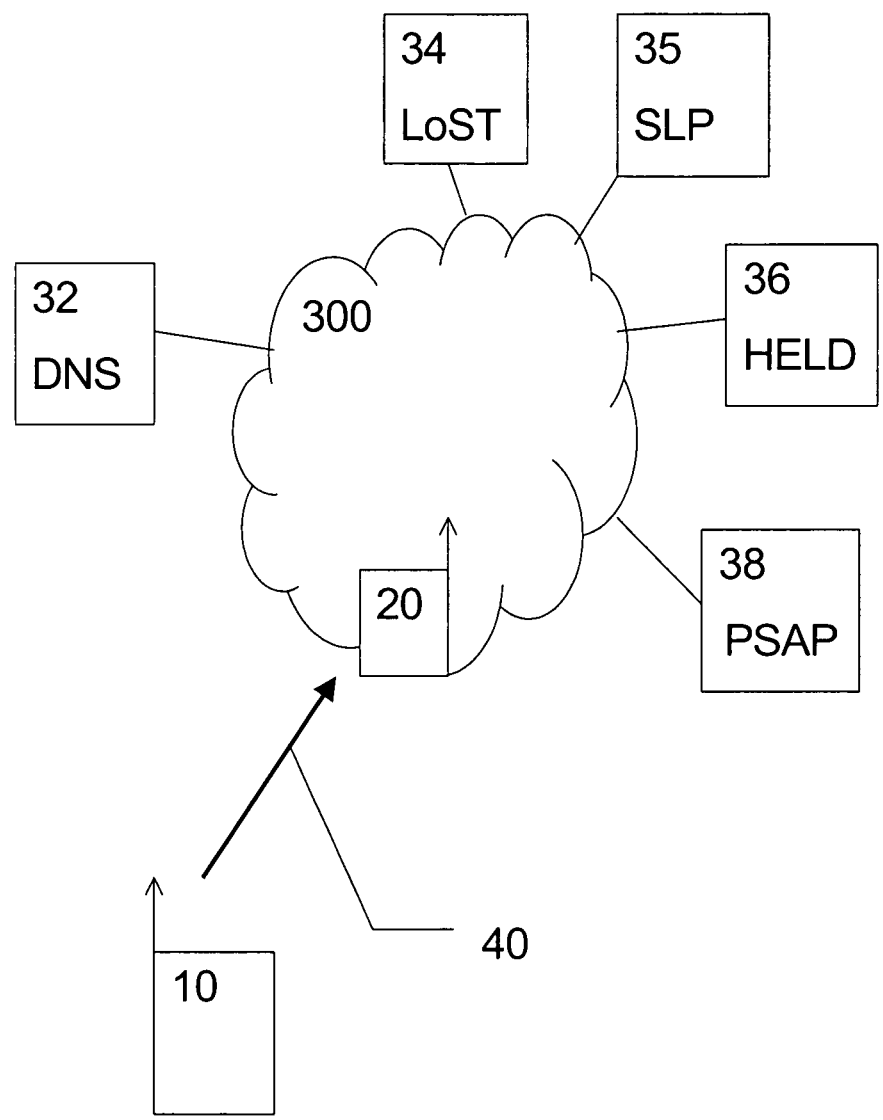
FIG. 1 shows a schematic diagram indicating a network architecture in which the present invention can be implemented.

FIG. 1 shows a schematic diagram of a general network architecture in which the present invention can be implemented. A cellular radio access network 300, e.g., Universal Mobile Telecommunications System (UMTS) Terrestrial Access Network (UTRAN) according to the Long Term Evolution (LTE) or $3^{rd}$ Generation Partnership Project (3GPP) Release 8 standard, is connected to a mobile terminal (e.g. user equipment (UE)) 10 via an access device 20, e.g., a radio network node such as base station device (eNodeB or Node B). The radio access network 300 provides access to specific servers of an IP-based network, such as the Internet. These specific servers comprise a DNS server 32, an allocated LoST server 34, an allocated HELD server 36, an SLP (Secure User Plane Location (SUPL) Platform) server 35, and a PSAP 38 to which emergency calls are to be routed.

According to various embodiments, the UE 10 transmits a domain name server (DNS) query 40 to request an identifier (e.g. server address or the like) of at least one of the HELD, LoST ans SLP servers 36, 34, 35.

In cellular networks such as radio access network 300, the UE 10 is able to discover the identity of the cell where it is connected. Typically, a cell identifier (CI) or a global cell identifier (Cell Global Identity (CGI)) are broadcasted and used in the radio signalling between the UE 10 and the radio access network 300. Therefore the UE 10 knows all the time the CI or CGI of the radio cell. In addition, the $3^{rd}$ Generation Partnership Project (3GPP) has specified that a mobile device, e.g. the UE 10, shall include the used CI or CGI in session initiation protocol (SIP) signalling.

In the embodiments described below, a database 32 is introduced, that accepts the CI or CGI and corresponding 3G and LTE cell identities as input in queries and returns a variety of information as output, including, but not limited to, the URI of the LoST and HELD servers 34, 36 serving the geographical location where the cell is physically located.

In an alternative implementation (not shown), the UE 10 may as well use a media access control (MAC) address of a wireless base station (e.g. a wireless local area network (WLAN) or WIMAX access points) to which the UE 10 is connected in a similar way to determine the corresponding HELD and LoST servers serving the location of the base station in question.

In the example of FIG. 1, the database 32 is implemented as a DNS server, which may also be called a Dynamic Discovery Delegation Service (DDDS), or in a similar way by introducing a new DNS type of server dedicated for the discovery of LoST and HELD servers.

In the first embodiment, CI(s) and CGI(s) are used as a new type of input in the DNS query and the DNS functionality is made capable of determining the corresponding HELD and LoST servers based on the radio cell where the UE 10 is currently located. In other embodiments the CI(s) and CGI(s) are used as input in the DNS query and the DNS functionality is made capable of determining the URIs of any telecommunication service available to the terminal in the area corresponding to the CI(s) and CGI(s). As a specific implementation example, the type of query set to U-NAPTR, as exemplified in specification RFC 4848, Section 3 of the Internet Engineering Task Force (IETF), may be used. The corresponding output of the DNS query is based on or uses existing protocol elements described in RFC 4848, Section 4.

When the access operator appropriately configures its Domain Name System (DNS), any connection endpoint (such as the UE 10) can query the DNS to find out which is the appropriate LoST or HELD server or the URI(s) of any corresponding telecommunication service.

FIG. 2 shows a schematic signaling diagram according to a first embodiment of the present invention.

The UE 10 has found the address of its DNS server 32 according to regular procedures (e.g., preconfigured, via DHCP, or PDP context activation). The UE 10 has also learned its CI. Now, the UE 10 needs to find its allocated LoST and HELD servers 34, 36, but it is not aware of the address of the servers configured by the access operator.

In step 101, the UE 10 sends a DNS NAPTR query that contains the current CI or CGI and the protocol of interest (e.g. LoST or HELD). In case of the CGI, it is formatted in a hierarchical order, so that the different fields that compose the CGI are separated by a dot. Then, in step 102, the DNS server 32 sends a DNS response containing the address of the local LoST or HELD server (or both), which may have been extracted from its configuration. The UE 10 may then initiate in step 103 a regular HELD query (e.g. "HTTP GET") to retrieve detailed location information, which is sent in step 104 in a HELD response (e.g. "HTTP 200" (OK)). With that detailed information, the UE 10 can do a LoST query (e.g. "HTTP POST") in step 105 to find out the Session Initiation Protocol (SIP) address of the local PSAP 38, which is returned in step 106 in a LoST response (e.g. "HTTP 200" (OK)).

Finally, in step 107 the UE 10 can make an emergency call in step 107 and address it to the local (and closest) PSAP 38.

It is noted that the embodiment and all later embodiments can be used outside emergency calls, where the UE 10 can make use of any other local services.

FIG. 3 shows an example of configuration of a NAPTR resource record in DDDS which could be used in the first embodiment. First, two new applications are defined for U-NAPTR called "Cell-Identity" (CI) and "Cell Global Identity" (CGI) and are then associated to the LoST and HELD protocols.

Figure 5:
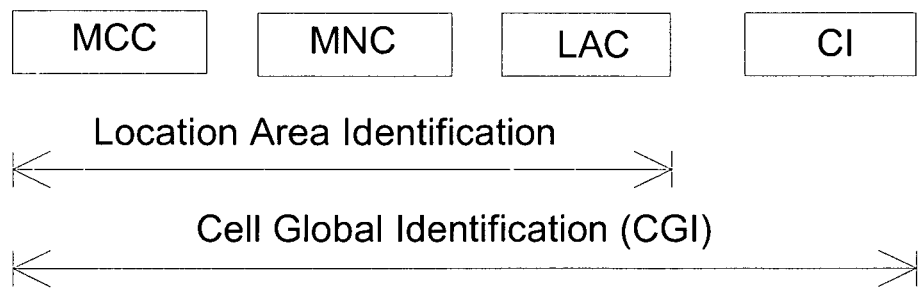
FIG. 5 shows a schematic structure of a cell global identifier.

FIG. 5 shows a relation between the CI and CGI. The CGI comprises a location area identification and the CI. The location area identification consists of a mobile country code (MCC), a mobile network code (MNC) and a location area code (LAC).

Figure 4:
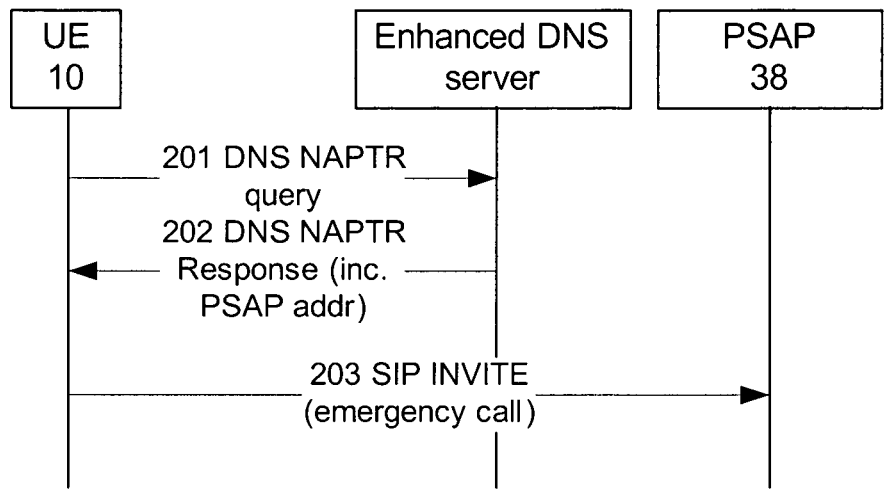
FIG. 4 shows a schematic signaling diagram according to a second embodiment of the present invention.

FIG. 4 shows a schematic signaling diagram of an enhancement according to a second embodiment, where three nodes or servers are combined together, namely the DNS server 32, the LoST server 34, and the HELD server 36. In the second embodiment, the UE 10 makes a DNS NAPTR query in step 201 and receives a response in step 202. The response contains the local PSAP address (or any other local address of the requested service). Then, in step 203, the UE 10 can make the emergency call or any other localized service, e.g., by issuing a SIP INVITE message.

Figure 6:
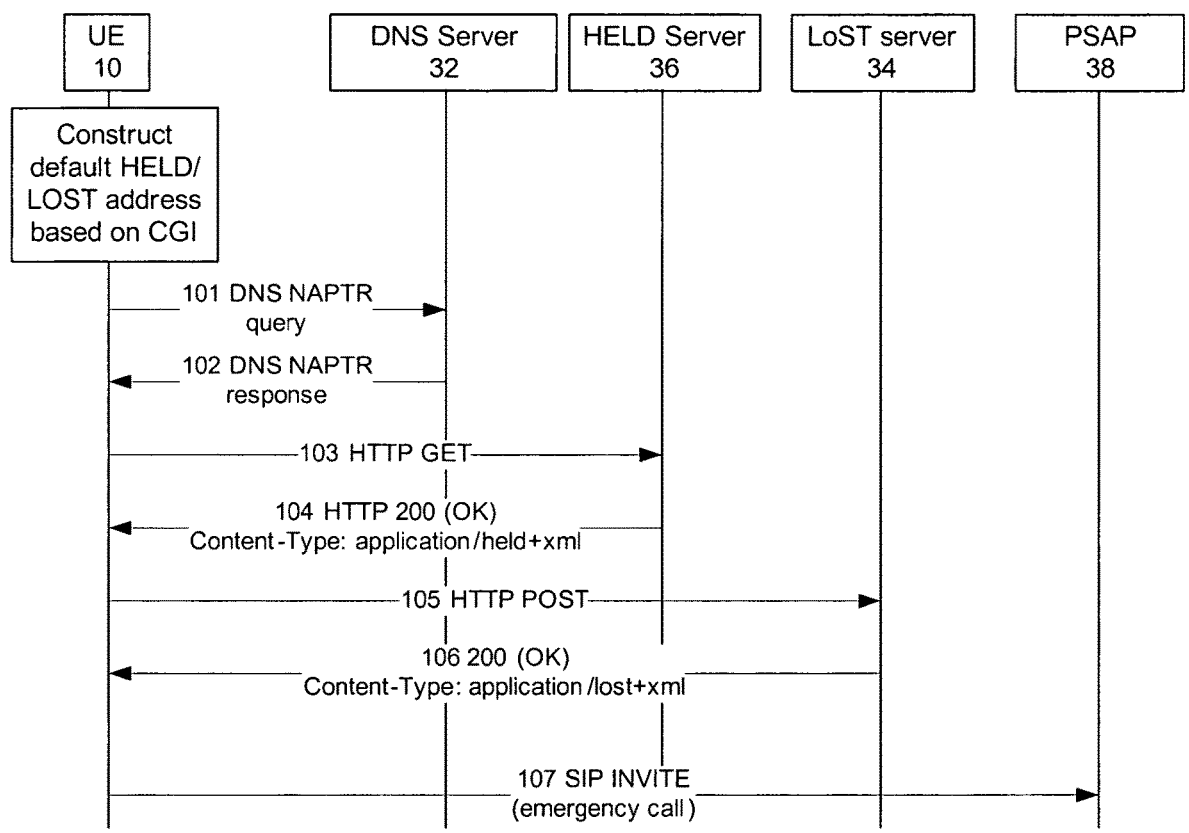
FIG. 6 shows schematic signaling diagram according to a third embodiment of the present invention.

FIG. 6 shows schematic signaling diagram according to a third embodiment of the present invention, which doesn't require any changes to DNS. The proposed acquisition procedure provides auto-provisioning of the UE 10 with LoST and/or HELD server addresses (e.g. URIs) based on the CGI or for Secure User Plane Location (SUPL) when auto-provisioning the E-SLP (Enhanced SUPL Location Platform) address. The UE 10 can then use the auto-provisioned URIs in the DNS query to obtain the IP address of the LoST, HELD and E-SLP servers, respectively.

The diagram and steps of FIG. 6 are similar to those of FIG. 2, except for an initial construction step or process, where default server addresses are constructed or set up based on the CGI.

The same construction process can be applied when constructing an SLP or E-SLP address, wherein a SUPL enabled terminal(s) (SET) Initiated SUPL session is initiated towards an E-SLP server. SUPL employs user plane data bearers for transferring location information, (e.g. Global Positioning System (GPS) assistance), and for carrying positioning technology-related protocols between a SET and the network. SUPL provides an effective way of transferring location information required for computing the SET's location. Further details on SUPL can be gathered from Open Mobile Alliance (OMA) specifications.

It is however noted that the procedures and concepts of the first and second embodiments may as well be applied to the address retrieval for the SLP or E-SLP server.

Figure 7:
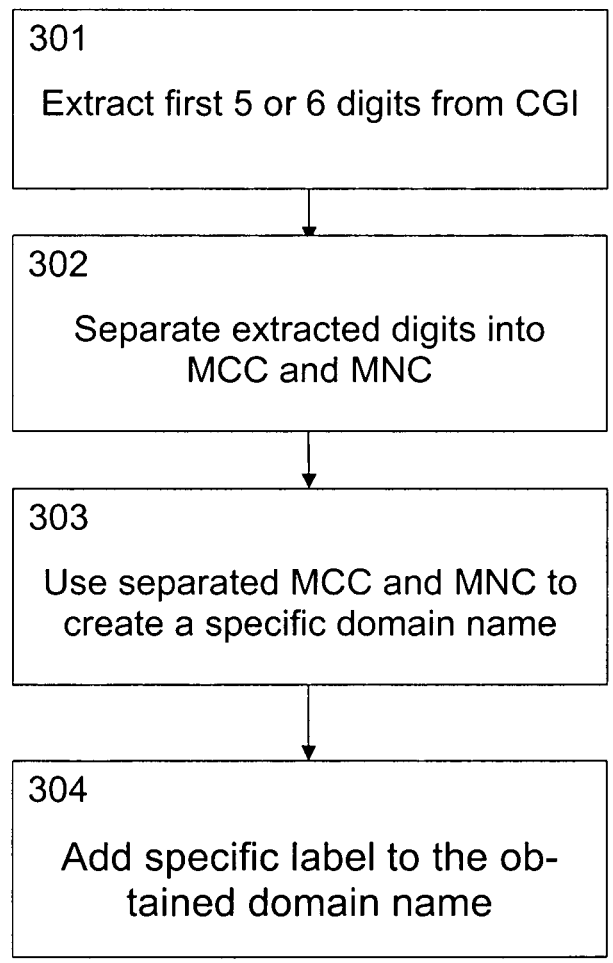
FIG. 7 shows flow diagram of a configuration procedure according to the third embodiment.

FIG. 7 shows a flow diagram example of a configuration procedure according to the second and third embodiments. The procedure or mechanism can be used for example to configure a default LoST/HELD/E-SLP server address.

In step 301, the first 5 or 6 digits of the CGI, depending on whether a 2 or 3 digit MNC is used are extracted. Then, in step 302, they are separated into MCC and MNC. If the MNC is 2 digits long, then a zero can be added at the beginning.

In step 303, the extracted MCC and MNC derived in steps 301 and 302 and the LAI are used to create a default domain name as follows (the below expression is0020based on Annex E of 3GPP specification TS 23.003):

"mnc<MNC>.mcc<MCC>.lai<LAI>.pub.3gppnetwork.org".

Finally, in step 304, a label "held.", "lost." or "e-slp." is added to the beginning of the configured default domain name.

As an example, if a CGI in use is "234150999999999", where MCC=234, MNC=15, and LAI (LAC+CI)=0999-999999, the following configured default domain names would be obtained for the different server types:

LoST server: "lost.mnc015.mcc234. lai09999-99999.pub.3gppnetwork.org",

HELD server: "held.mnc015.mcc234. lai0999999999. pub.3gppnetwork.org"

E-SLP server: "e-slp.mnc015.mcc234. lai0999999999. pub.3gppnetwork.org".

Thus, if the UE 10 is not provisioned with a HELD/LoST/E-SLP server URI, the UE 10 constructs the URIs according to the scheme above. The UE 10 then makes a normal DNS query using the default auto-provisioned URIs to obtain the IP address of the HELD/LoST/E-SLP servers. The DNS server 32 may have been provisioned with the default addresses to return the IP addresses to the normal DNS query. The UE 10 can then contact the HELD/LoST/E-SLP servers by using the received IP addresses and the call flow continues as normal. As the default fully qualified domain name (FQDN) goes down to cell level any number of LoST/HELD/E-SLP servers can be provisioned in the DNS for load balancing purposes.

Figure 8:
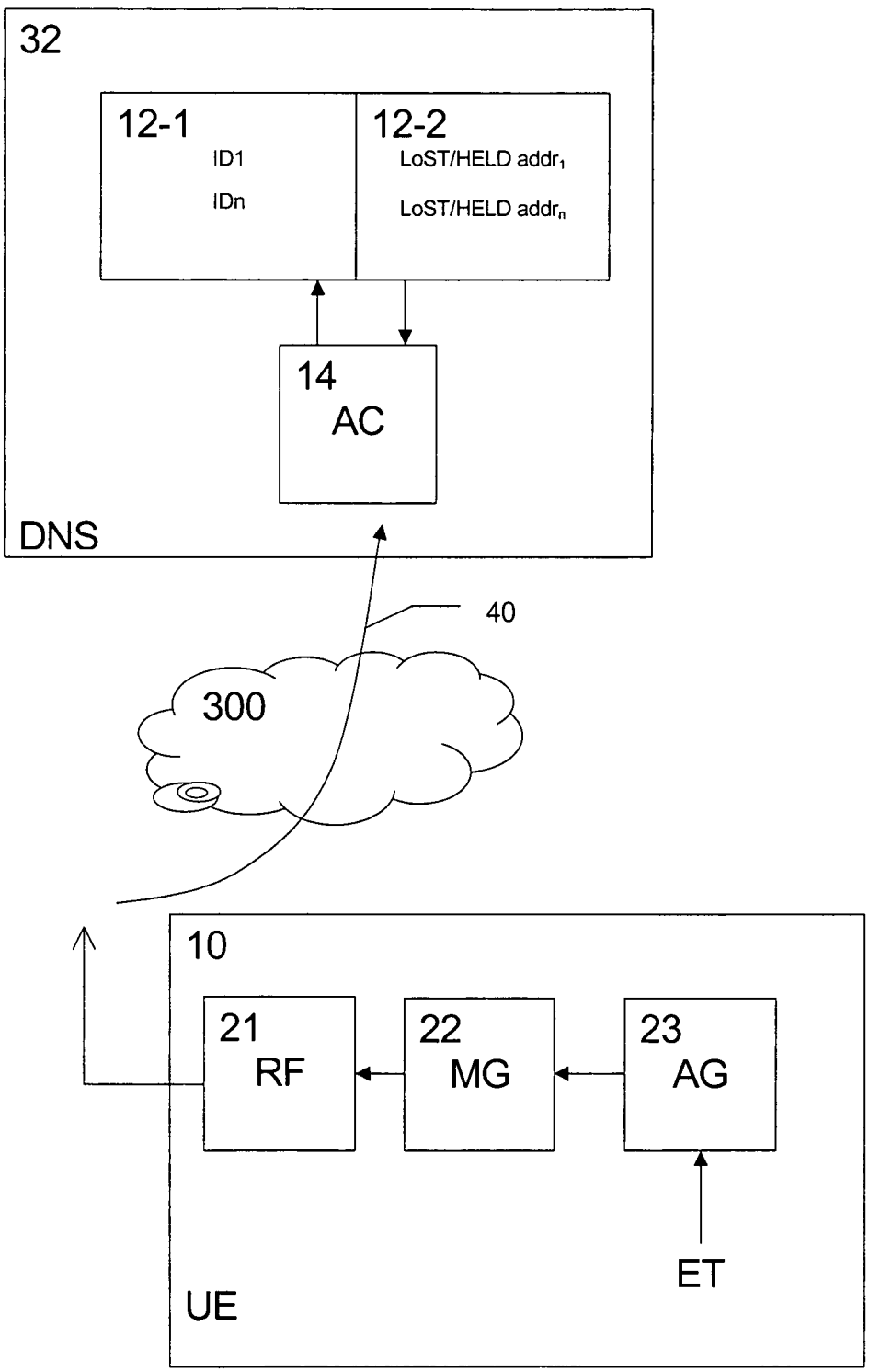
FIG. 8 shows schematic block diagrams of a mobile device and a database according to various embodiments of the present invention.

FIG. 8 shows schematic block diagrams of a mobile device and a database, which may be used in the above embodiments. The description is based on an exemplary implementation for an emergency service.

The UE 10 comprises an radio frequency (RF) unit 21 for transmitting and receiving radio signals to/from the radio access network 300. If an emergency trigger ET is activated (e.g. by pressing an emergency button or the like), an address generation function or unit 23 determines a unique identifier as described in the above embodiments and forwards the unique identifier to a message generation function or unit 22 which generates the DNS query with the determined unique identifier to be transmitted to the DNS server 32.

The DNS server 32 comprises an access control functionality or unit (AC) 14 which provides access to the database. The database comprises a pointer section 12-1 and an associated address section 12-2. In the pointer section 12-1, identifiers ID1-Idn are stored which may correspond to the above mentioned C is, MAC addresses, default addresses as examples of unique identifiers of the access device 20. The address section 12-2 stores server addresses (e.g. LoST, HELD or E-SLP server addresses) associated with the identifiers in the pointer section 12-1.

When the DNS query with the unique identifier is received from the UE 10 via the radio access network 300, the access control unit 14 accesses the pointer section 12-1 of the database by using the unique identifier as a pointer and receives from the address section 12-2 the associated server address(es). The retrieved server address(es) are then forwarded to the UE 10 in a corresponding DNS response, and can be used for accessing the PSAP 38 to initiate an emergency call processing.

Figure 9:
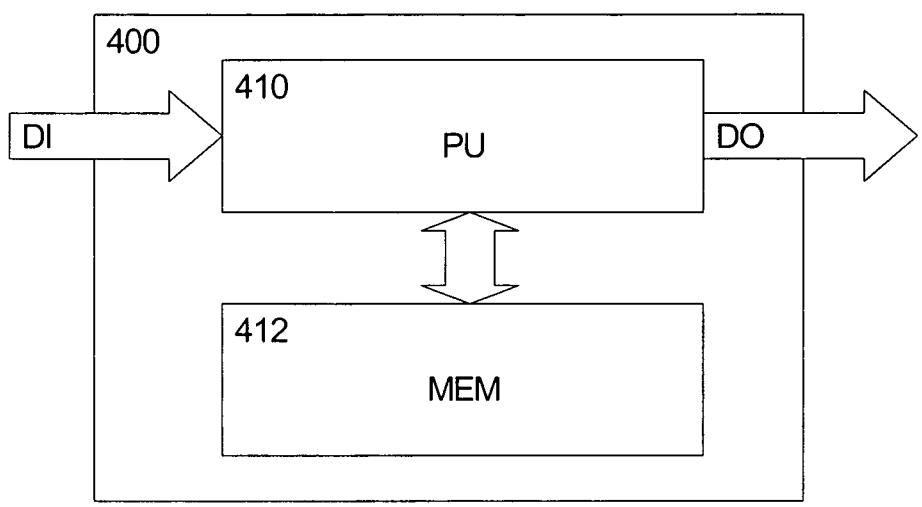
FIG. 9 shows a schematic block diagram of a software-based implementation according to a fourth embodiment of the present invention.

FIG. 9 shows a schematic block diagram of an alternative software-based implementation according to a fourth embodiment. The required functionalities can be implemented in any mobile device 400 with a processing unit 410, which may be any processor or computer device with a control unit which performs control based on software routines of a control program stored in a memory 412. The control program may also be stored separately on a computer-readable medium. Program code instructions are fetched from the memory 412 and are loaded to the control unit of the processing unit 410 in order to perform the processing steps of the above functionalities of FIGS. 7 and 8, which may be implemented as the above mentioned software routines. The processing steps may be performed on the basis of input data DI and may generate output data DO. The input data DI may correspond to a CGI or MAC address or other unique identifier of the concerned radio access device and the output data DO may correspond to the server query to be transmitted to the DNS server 32 or any other proxy server used for retrieving the desired identifier Consequently, the above embodiments may be implemented as a computer program product comprising code means for generating each individual step of the signaling procedure when run on a computer device or data processor of the receiving device (e.g. NodeB 20) or transmitting device (e.g. UE 10), respectively.

In summary, a method, apparatus, system, and computer program product have been described, in which a unique identifier of a node (such as an access node) of a radio network is used to request from a database location-dependent information for a mobile device attached to the node. An identifier of at least one server serving an area in which the mobile device is located is then retrieved by using the location-dependent information.

It is apparent that the invention can easily be extended to any service and network environment (fixed and wireless), where a location-dependent information is required for accessing a server which offers a desired service. The server can provide any telecommunication services and is not limited to the server types mentioned in the preferred embodiments. Specifically, the present invention is not intended to be restricted to the above network environment of the embodiments. It can be implemented in any network environment (for example, the invention can be used in non wireless networks where a fixed device, such as a computer or fixed phone attaches to a network). Moreover, any type of unique identifier of any kind of node can be used for the server query. As an example, a line identifier (line ID) can be used in addition to or as an alternative to the above CI and MAC address. Furthermore, the line identifier can be stored in a node (which covers network devices and terminal devices) where the device is connected to and is thus unique for each line and the connected device. Hence, the term "unique identifier" is intended to cover any type of line identifier including a terminal (device) specific identifier. Moreover, there may be more than one unique identifier for a node, so that a node can have several devices connected via several lines where each line has a unique line identifier. As the line identifier is then unique for each line, it is also unique for each connected device. The unique line identifier(s) can be stored and assigned in the node where the device is connected to.

The LoST server could also deliver the PSAP address (or the URI of any tele-communication service/server) corresponding to the line id of the terminal device. The line ID could be e.g. a telephone number of the terminal device. The embodiment may thus vary within the scope of the attached claims.

According to an exemplary embodiment of the present invention, in a first aspect, a method may be provided which may use a unique identifier of a node of a network to request from a database location-dependent information for a device attached to the node; and which may determine an identifier of at least one server serving an area in which the device is located, by for example using the location-dependent information.

Further refinements of the first aspect of the present invention may be:

The node may be a component of a fixed network and the device may be a wireless device.

The node may be a component of a fixed network and the device may be a fixed device.

The unique identifier may comprise at least one of a cell identifier of a cellular transmission system, a media access control layer address of an access point of a local area network, and a line identifier of the device.

The method may comprise setting up a default server address at the device by using at least parts of the unique identifier.

The cell identifier may be a cell global identifier wherein a default server address may be set up from at least one of a mobile network code, a mobile country code and a location area code of the cell global identifier.

The location-dependent information may be requested by a query to a domain name system.

The location-dependent information may comprise an identifier of the at least one server or an identifier of at least one of a translation server and a location discovery server, which may serve the network node to obtain the identifier of the at least one server.

The translation server may comprise a location-to-server translation server and the location discovery server may comprise a hyper text transfer protocol enabled location discovery server.

The identifier may comprise a uniform resource identifier.

The database may be implemented as a server of a domain name system.

The server of the domain name system may comprise at least one of a translation server and a location discovery server, which may serve the network node to obtain the identifier of the at least one server.

The server may serve as a public safety answering point.

The method may further comprise requesting the location-dependent information based on a naming authority pointer resource record.

According to an exemplary embodiment of the present invention, in a second aspect, an apparatus may be provided which may comprise a service access means which may be configured to use a node identifier of a node of a network to which the apparatus may be attached, in a database request for location-dependent information for the apparatus, and may be configured to determine an identifier of at least one server serving an area in which the apparatus may be located by using the requested information.

Further refinements of the second aspect of the present invention may be:

The node may be a component of a wireless network.

The node may be a component of a fixed network.

The unique identifier may comprise at least one of a cell identifier of a cellular transmission system, a media access control layer address of an access point of a local area network, and a line identifier.

The service access means may be configured to set up a default server address by using at least parts of the cell identifier.

The cell identifier may be a cell global identifier and a default server address may be configured to set up the default server address from at least one of a mobile network code, a mobile country code and a location area code of the cell global identifier.

The service access means may be configured to request the location-dependent information by a query to a domain name system.

The service access means may be configured to provide in the location-dependent information an identifier of the at least one server or an identifier of at least one of a translation server and a location discovery server, which may serve the node of a network to obtain the identifier of the at least one server.

The service access means may be configured to provide the identifier with a uniform resource identifier.

The service access means may be configured to request the location-dependent information based on a naming authority pointer resource record.

According to an exemplary embodiment of the present invention, in a third aspect, a database may be provided which may be configured to store location-dependent information in association with node identifiers of a network node, wherein the database may be configured to output the location-dependent information in response to a request directed to a respective node identifier.

Further refinements of the third aspect of the present invention may be:

The unique identifier may comprise at least one of a cell identifier of a cellular transmission system, a media access control layer address of an access point of local area network, and a line identifier of a device connected to the network node.

The database may be implemented as a server of a domain name system.

According to an exemplary embodiment of the present invention, in a fourth aspect, a computer program product may be provided which may comprise code means which may generate the steps of the method according to the first aspect of the present invention.

According to an exemplary embodiment of the present invention, in a fifth aspect, a system which may signal control information may be provided, the system may comprise at least one apparatus according to the second aspect of the invention and at least one database according to the third aspect of the present invention.

According to an exemplary embodiment of the present invention, in a sixth aspect, a mobile apparatus may be provided, where the mobile apparatus may comprise an apparatus according to the second aspect of the invention.

The invention claimed is:

1. A method comprising:
a user equipment sending a query to request from a database of a domain-name server an identifier of at least one server for the user equipment capable of being attached via a wireless connection to a base station access node of a radio access network, the query using a unique identifier of said base station access node, wherein the query includes a default server address set up by said user equipment by using at least parts of said unique identifier;
the user equipment receiving the identifier of the at least one server serving an area where the user equipment is located; and
the user equipment sending a message to the at least one server.

2. The method according to claim 1, where said node is a component of a wireless network and said user equipment is a wireless device.

3. The method according to claim 1, where said node is a component of a fixed network and said user equipment is a fixed device.

4. The method according to claim 1, wherein said unique identifier comprises at least one of a cell identifier of a cellular transmission system, a media access control layer address of an access point of a local area network, and a line identifier of the device.

5. The method according to claim 4, wherein said cell identifier is a cell global identifier and wherein the default server address is set up from at least one of a mobile network code, a mobile country code and a location area code of said cell global identifier.

6. The method according to claim 1, wherein said identifier of at least one server is requested by a query to a domain name system.

7. The method according to claim 1, wherein said default server address comprises a uniform resource identifier.

8. The method according to claim 1, wherein said database is implemented as a server of a domain name system.

9. The method according to claim 8, wherein said server of said domain name system comprises at least one of a translation server and a location discovery server, which serve said network node to obtain said identifier of said at least one server.

10. The method according to claim 1, wherein said server serves as a public safety answering point.

11. The method according to claim 1, further comprising requesting said identifier of at least one server based on a naming authority pointer resource record.

12. An apparatus comprising one or more processors and one or more memories including computer program code, the one or more memories and the computer program code being configured, with the one or more processors, to cause the apparatus to perform at least the following:
  sending a query to request from a database of a domain-name server an identifier of at least one server for said apparatus, said apparatus being capable of being attached via a wireless connection to a base station access node of a radio access network, the query using a unique identifier of said base station access node, wherein the query includes a default server address set up by said apparatus by using at least parts of said unique identifier;
  receiving the identifier of at least one server serving an area where said apparatus is located; and
  sending a message to the at least one server.

13. The apparatus according to claim 12 where said node is a component of a wireless network.

14. The apparatus according to claim 12 where said node is a component of a fixed network.

15. The apparatus according to claim 12, wherein said unique identifier comprises at least one of a cell identifier of a cellular transmission system, a media access control layer address of an access point of a local area network, and a line identifier.

16. The apparatus according to claim 15, wherein said cell identifier is a cell global identifier and wherein the default server address is configured to set up said default server address from at least one of a mobile network code, a mobile country code and a location area code of said cell global identifier.

17. The apparatus according to claim 12, wherein said computer program code is further configured to request said identifier by a query to a domain name system.

18. The apparatus according to claim 12, wherein said computer program code is further configured to provide said default server address with a uniform resource identifier.

19. The apparatus according to claim 12, wherein said computer program code is further configured to request said identifier of at least one server based on a naming authority pointer resource record.

20. The apparatus according to claim 12 wherein the apparatus is a mobile device.

21. A computer program product provided on a non-transitory computer readable medium, the computer program product comprising instructions for performing at least the following when run on a computer device:
  sending a query to request from a database of a domain-name server an identifier of at least one server for the computer device, said computer device being capable of being attached via a wireless connection to a base station access node of a radio access network, the query using a unique identifier of said base station access node, wherein the query includes a default server address set up by said computer device by using at least parts of said unique identifier;
  receiving the identifier of at least one server serving an area where said computer device is located; and
  sending a message to the at least one server.

22. A method comprising:
  receiving from a user equipment at a database of a domain-name server a query using a unique identifier of a base station access node of a radio access network, the query requesting an identifier of at least one server for the user equipment capable of being attached via a wireless connection to the base station access node, wherein the query includes a default server address set up by said user equipment by using at least parts of said unique identifier; and
  sending by the database to the user equipment an identifier of the at least one server, the at least one server serving an area where said user equipment is located, in order that the user equipment is able to send a message to the at least one server.

* * * * *